United States Patent

Seber et al.

[11] Patent Number: 5,964,131
[45] Date of Patent: Oct. 12, 1999

[54] HAND TOOL WITH SCULPTED HANDLES AND INTEGRAL KEY RING

[75] Inventors: Brett P. Seber; Gregory F. Rubin, both of Escondido, Calif.

[73] Assignee: Valle de Oro Bank, N.A., La Mesa, Calif.

[21] Appl. No.: 09/013,693

[22] Filed: Jan. 26, 1998

Related U.S. Application Data

[63] Continuation-in-part of application No. 08/785,633, Jan. 17, 1997.

[51] Int. Cl.$^6$ ........................................................ B25B 7/00
[52] U.S. Cl. ........................ 81/427.5; 81/177.4; 81/177.7; 7/128
[58] Field of Search ...................... 7/125–129, 132, 7/165, 901; 81/415, 427.5, 489, 437–440, 490, 177.6–177.9, 177.4, DIG. 5, 900

[56] References Cited

U.S. PATENT DOCUMENTS

| | | |
|---|---|---|
| D. 137,408 | 3/1944 | Frisk . |
| 266,073 | 10/1882 | Austin ...................................... 7/128 X |
| D. 286,501 | 11/1986 | Magan . |
| 295,885 | 3/1884 | Pullman . |
| D. 338,386 | 8/1993 | Frazer . |
| D. 356,019 | 3/1995 | Sakai . |
| D. 382,182 | 8/1997 | Seber et al. . |
| 542,601 | 7/1895 | Baker . |
| 589,392 | 8/1897 | Kolar . |
| 592,766 | 11/1897 | Clutz . |
| 596,096 | 12/1897 | Watts . |
| 614,537 | 11/1898 | Dahlquist . |
| 649,334 | 5/1900 | Meloos . |
| 662,005 | 11/1900 | Lewis . |
| 790,432 | 5/1905 | Heilrath . |
| 857,459 | 6/1907 | Hendrickson . |

(List continued on next page.)

FOREIGN PATENT DOCUMENTS

| | | |
|---|---|---|
| 0783938A2 | 7/1997 | European Pat. Off. . |
| 2463 | 1/1869 | France . |
| 30788 | 3/1885 | Germany . |
| 1002145 | 3/1983 | Russian Federation . |
| 17248 | of 1896 | United Kingdom . |
| 20299 | of 1902 | United Kingdom . |
| 15859 | of 1904 | United Kingdom . |
| 13254 | of 1905 | United Kingdom . |
| 14268 | of 1907 | United Kingdom ....................... 7/128 |
| 186520 | 10/1922 | United Kingdom . |

*Primary Examiner*—D. S. Meislin
*Attorney, Agent, or Firm*—Kelly Bauersfeld Lowry & Kelley, LLP

[57] ABSTRACT

A hand tool includes a pliers jaw mechanism and two solid-body handles that pivot about the lugs of the jaw mechanism between open and closed positions. The ends of the solid-body handles are in the form of implements. The externally facing surfaces of the handles are dished to conform to the sides of the jaw mechanism when the handles are closed. The jaw lugs include cam surfaces over which corresponding surfaces of the solid-body handles ride to provide detents for the handles in the open and closed positions. The jaw lugs include facing protrusions that define a key ring when the handles are in the closed position. The face of the hand tool presents a broad, generally planar surface suitable for the imprinting of information thereon.

23 Claims, 6 Drawing Sheets

U.S. PATENT DOCUMENTS

| | | |
|---|---|---|
| 858,003 | 6/1907 | Klever . |
| 896,746 | 8/1908 | McCarty . |
| 988,068 | 3/1911 | Beardsley et al. . |
| 1,174,132 | 3/1916 | Dragun . |
| 1,184,746 | 5/1916 | Hanson . |
| 1,194,296 | 8/1916 | McNally . |
| 1,334,425 | 3/1920 | Wernimont . |
| 1,370,906 | 3/1921 | Newton . |
| 1,461,270 | 7/1923 | Garrison ................................ 81/427.5 |
| 1,467,661 | 9/1923 | Undy . |
| 1,474,592 | 11/1923 | Jacoby . |
| 1,486,725 | 3/1924 | Brown . |
| 1,511,340 | 10/1924 | Jackson . |
| 1,524,694 | 2/1925 | Maio . |
| 1,551,328 | 8/1925 | Perry . |
| 1,561,833 | 11/1925 | Cruickshank . |
| 1,561,993 | 11/1925 | Nielsen . |
| 1,619,181 | 3/1927 | Beretz . |
| 2,057,201 | 10/1936 | McCluskey . |
| 2,514,130 | 7/1950 | Jones . |
| 2,561,682 | 7/1951 | Barnett . |
| 2,575,652 | 11/1951 | Bovee . |
| 2,606,471 | 8/1952 | Kollweck . |
| 2,641,149 | 6/1953 | Petersen . |
| 2,747,446 | 5/1956 | Eder . |
| 2,779,098 | 1/1957 | Pocoski et al. . |
| 2,814,108 | 11/1957 | Bassett . |
| 3,044,081 | 7/1962 | Robinson, Jr. . |
| 3,364,508 | 1/1968 | Garrett . |
| 3,798,687 | 3/1974 | Stevens . |
| 4,238,862 | 12/1980 | Leatherman . |
| 4,502,220 | 3/1985 | Aoki . |
| 4,512,051 | 4/1985 | Magan . |
| 4,744,272 | 5/1988 | Leatherman . |
| 4,805,303 | 2/1989 | Gibbs . |
| 4,888,869 | 12/1989 | Leatherman . |
| 5,044,079 | 9/1991 | Gibbs . |
| 5,062,173 | 11/1991 | Collins et al. . |
| 5,142,721 | 9/1992 | Sessions et al. . |
| 5,267,366 | 12/1993 | Frazer . |
| 5,320,004 | 6/1994 | Hsiao . |
| 5,491,856 | 2/1996 | Legg . |

4
HAND TOOL WITH SCULPTED HANDLES AND INTEGRAL KEY RING

RELATED APPLICATION

This is a continuation-in-part of U.S. patent application Ser. No. 08/785,633, filed Jan. 17, 1997.

BACKGROUND OF THE INVENTION

This invention relates to multi-purpose hand tools, and, more particularly, to a combination tool having a jaw mechanism and folding handles with implements thereon.

Combination tools, also termed multi-function or multi-purpose hand tools, have become increasingly popular. Such combination tools typically include a jawed mechanism such as a pliers or a scissors, and deployable handles having implements pivotally folded into the handles. The implements typically include slot screwdrivers, Phillips-head screwdrivers, knife blades, can openers, awls, and the like. The implements are folded into the handles for storage or when the jaw mechanism is to be used, and pivoted open as necessary. Designs and features of combination tools have been extensively patented. Combination tools are available commercially from a number of manufacturers, such as Buck Knives, SOG, Leatherman, and Gerber.

These combination tools are used by a variety of persons, such as repairmen, outdoorsmen, handymen, and hobbyists. The combination tools, while of about the same size, are mechanically more robust than the multi-bladed knives generally known as "Swiss Army" knives. The combination tools have substantial jaw mechanisms, and, at least in some cases, the fold-out implements may be positively locked into place to avoid unintended closing and injury to the user.

Commercial combination tools are typically about 4 inches long, 1–1¼ inches wide, and ½ inch thick with the handles folded, although the sizes vary somewhat by manufacturer. The combination tools are usually sold with a pouch having a belt loop or with a clip on the side of the tool that may be clipped into a pants pocket. Such tools, while highly useful in many situations, are still too large for others. For example, office workers do not ordinarily carry a combination tool, because the pouch and clip-on tool are not readily compatible with conventional business clothes. Also, many of the implements available on commercial combination tools are not needed in an office environment.

There is a need for smaller combination tools that provide a jawed mechanism as well as at least some of the implement features of the larger combination tools. The combination tools discussed above cannot be readily scaled down to half-size or smaller, because of assembly tolerances and the loss of utility of the smaller pivotable implements. However, one such smaller combination tool is described in U.S. Pat. No. 5,491,856. The tool of the '856 patent has a jaw mechanism and handles with stationary implements forming the ends of the handles. The jaw mechanism includes an opening in the pliers head, normally used to grasp nut heads in a conventional pliers, for convenient attachment to a key ring. The present inventors have recognized that this device, while operable, has important shortcomings. The handles are essentially square and unsculpted in cross section, so that they are not convenient to grasp when open. The handles fold open parallel to each other, so that it is difficult to apply much leverage into the pliers head. There is little or no detent feature for the handles in the open and closed positions, so that they must be held in place during service. Moreover, the key-ring attachment precludes the use of a conventional nut-grasping feature in the pliers head.

There is accordingly a need for a combination tool that is suitable for production in sizes in the range of about 2 inches long, and that is convenient for both use and storage in that size range. The present invention fulfills this need, and further provides related advantages.

SUMMARY OF THE INVENTION

The present invention provides a combination or multi-purpose hand tool which can be built in any size, but is particularly well suited for fabrication with a small overall length and weight than most conventional combination tools. A combination tool embodying the invention has a jaw mechanism with convenient implements. It is suited for attachment to a key ring or the like, but is also permits the use of a nut-grasping feature in the pliers head. The handles are sculpted for comfortable grasping during service. The combination tool also provides a large flat surface when the handles are folded closed, so that the face of the tool may be used for an emblem, advertising, or other visual information. The handles are provided with convenient detents in the closed and open positions.

In a preferred form of the invention, the hand tool comprises a pliers jaw mechanism lying in a jaw mechanism plane. The jaw mechanism includes a first jaw piece having a first jaw body, a first lug extending therefrom, and a first jaw piece external lateral surface. The jaw mechanism also includes a second jaw piece having a second jaw body, a second lug extending therefrom, and a second jaw piece external lateral surface. The first jaw piece and the second jaw piece are pivotably joined together to pivot about a jaw axis between a first jaw position wherein the jaw pieces are closed together in a facing relationship, and a second jaw position wherein the jaw pieces are not closed together. The tool further includes a first solid-body handle lying in the jaw mechanism plane and pivotably engaged by a first handle axle pin to the first lug. The first solid-body handle pivots in the jaw mechanism plane about a handle axis that is parallel to the jaw axis, between a first handle closed position wherein the first handle is adjacent to the second jaw piece and a first handle open position wherein the first handle is extended away from the first jaw piece. The first handle has a first handle distal end formed as a first handle implement, and a first handle external lateral surface having a dished shape to conform to at least a portion of the second jaw piece external lateral surface. The hand tool further includes a second solid-body handle lying in the jaw mechanism plane and pivotably engaged by a second handle axle pin to the second lug. The second solid-body handle pivots in the jaw mechanism plane about a handle axis that is parallel to the jaw axis, between a second handle closed position wherein the second handle is adjacent to the first jaw piece and a second handle open position wherein the second handle is extended away from the second jaw piece. The second handle has a second handle distal end formed as a second handle implement, and a second handle external lateral surface having a dished shape to conform to at least a portion of the first jaw piece external lateral surface.

The first lug and the second lug have facing protrusions thereon at locations remote from the jaw bodies, adjacent to the pivotable engagements of the respective handles to the lugs. The protrusions are dimensioned so that, when the jaw pieces are closed together, the tips of the protrusions overlap. An aperture is thereby defined that may be used to attach the hand tool to a key ring or the like, independently of the jaw feature so that the jaw may be provided with a faceted nut-engaging aperture.

A detent mechanism is desirably provided to urge each handle toward its respective open or closed position. A detent is distinct from a lock, wherein the handle would be positively locked into the open or closed position. In the present case, the detent for each handle is defined in relation to the handle axis. The detent includes a handle cam surface locally defining the surface of the handle and disposed laterally adjacent to the handle axis. The handle cam surface includes a closing handle cam surface having a handle cam surface first distance from the handle axis, an opening handle cam surface remote from the closing handle cam surface and at about the handle cam surface first distance from the handle axis, and an intermediate handle cam surface disposed between the closing handle cam surface and the opening handle cam surface and being a handle cam surface second distance from the handle axis, wherein the handle cam surface second distance is less than the handle cam surface first distance. The handle cam surface second distance is from about 0.002 inches to about 0.012 inches less than the handle cam surface first distance. With this detent mechanism, the lug of the jaw piece comprises a lug cam rider surface positioned in a facing relationship to the handle cam surface and disposed to ride thereon as the solid-body handle is moved between the handle closed position and the handle open position. The opening handle cam surface terminates in a handle shoulder remote from the intermediate handle cam surface, and the lug cam rider surface includes a lug shoulder disposed to engage the handle shoulder when the handle is in the handle open position.

On one or both handles a handle secondary implement is pivotably joined to the solid-body handle. In one embodiment, the handle secondary implement pivots about an axle pin that is spaced from the handle axle pin. In another embodiment, the handle secondary implement is pivotally engaged to the lug and to the solid-body handle at the handle axle pin. In both embodiments, the handle is desirably provided with a notch into which the secondary implement is received when the secondary implement is in a closed position lying adjacent to the handle. When the handle is in the closed position, the secondary implement may be pivoted to an open position so that it may be used.

The hand tool of the present invention has fewer capabilities than the commercial combination tools available from Buck Knives, Leatherman, SOG, and Gerber, for example. However, it may be made at less cost yet still in a quality manner. Further, the present hand tool may be made in a smaller size than the combination tools yet still be fully functional.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

The accompanying drawings illustrate the invention. In such drawings.

DETAILED DESCRIPTION OF THE DRAWINGS

As shown in the drawings for purposes of illustration, the present invention is concerned with a hand tool, generally designated in FIGS. 1–11 by the reference number 20 and in FIGS. 12–19 by the reference number 120. The hand tool 20 includes a jaw mechanism 22 having a first jaw piece 24 and a second jaw piece 26. The first jaw piece 24 and the second jaw piece 26 are pivotably joined together at a jaw pivot 28. The first jaw piece 24 and the second jaw piece 26 lie in a jaw mechanism plane 29, which is the plane of the illustration in FIGS. 1–2 and 7–10, and is illustrated in FIGS. 3–6. The jaw pivot 28 permits the first jaw piece 24 and the second jaw piece 26 to pivot between a closed position (as illustrated) with the jaws in a facing relationship, and an open position.

The first jaw piece 24 includes a first jaw body 30 and a first lug 32 extending therefrom. The first jaw piece 24 has an outwardly bowed first jaw piece external lateral surface 34, whose shape is generally dictated by the shape of the first jaw body 30. The second jaw piece 26 includes a second jaw body 36 and a second lug 38 extending therefrom. The second jaw piece 26 has an outwardly bowed second jaw piece external lateral surface 40, whose shape is generally dictated by the shape of the second jaw body 36.

The jaw bodies 30 and 36 may define any type of tool with a jawed pivoting structure. Preferably, as illustrated, the jaw bodies 30 and 36 cooperatively define a pliers with a grasping tip 42 and a faceted nut-grasping aperture 44. As will be discussed subsequently, the nut-grasping aperture 44 is not used for attachment of the hand tool to a key ring, and it therefore may be furnished with facets useful in grasping a nut or other object. A wire cutter 46 is formed by regions of reduced thickness adjacent to the nut-grasping aperture 44. The jaw bodies 30 and 36 could instead cooperatively define other types of jawed, pivoting structures, such as a scissors, a wire stripper, or other type of pliers.

Figure 1:
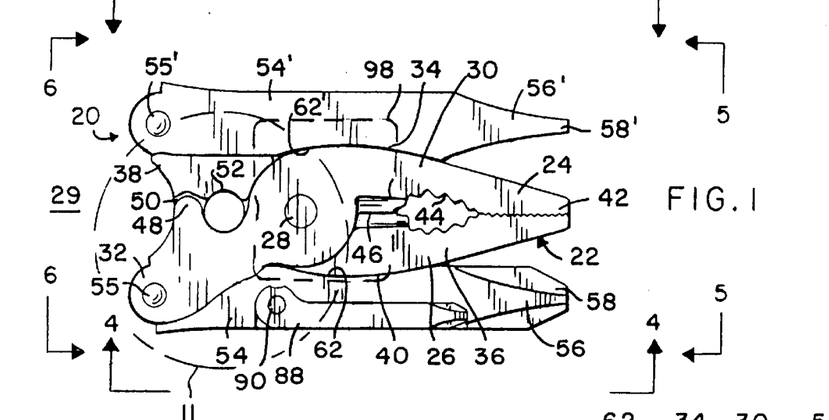
FIG. 1 is a top plan view of a first embodiment of the hand tool of the invention, with the handles in a closed position.
Figure 2:
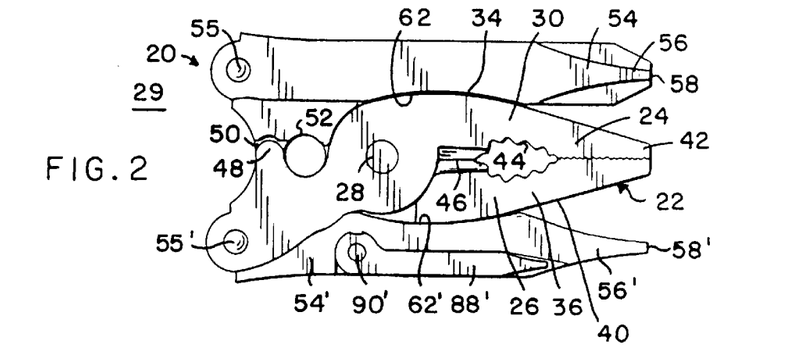
FIG. 2 is a bottom plan view of the hand tool of FIG. 1.
Figures 3, 4:
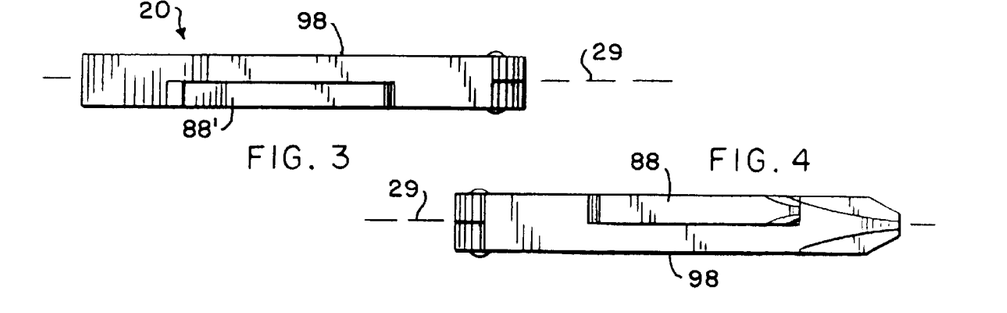
FIG. 3 is a side elevational view of the hand tool taken generally along the line 3—3 of FIG. 1.
FIG. 4 is a side elevational view of the hand tool taken generally along the line 4—4 of FIG. 1.
Figure 5:
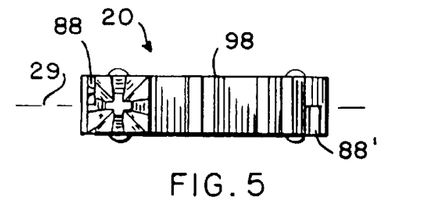
FIG. 5 is a front elevational view of the hand tool taken generally along the line 5—5 of FIG. 1.
Figure 6:
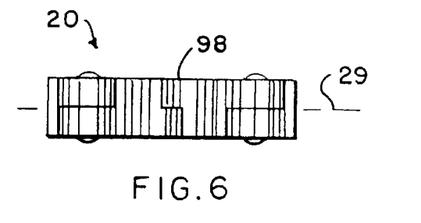
FIG. 6 is a rear elevational view of the hand tool taken generally along the line 6—6 of FIG. 1.

A first protrusion 48 extends from the first lug 32 toward the second lug 38 at a location remote from the first jaw body 30. A second protrusion 50 extends from the second lug 38 toward the first lug 32 at a location remote from the second jaw body 36. The first protrusion 48 and the second protrusion 50 are in a facing relationship to each other and overlap when the jaw mechanism 22 is closed. When the jaw mechanism 22 is closed, as illustrated in FIGS. 1–2, the first protrusion 48 and the second protrusion 50 cooperatively define an aperture 52. When the jaw mechanism 22 is closed and the handles are folded and detented into the closed position, as in FIGS. 1 and 2, the aperture 52 is locked closed such that it may be used to attach the hand tool 20 onto a key ring or other ring.

A first solid-body handle 54 lies in the jaw mechanism plane 29. The handle 54 is termed a "solid-body" handle because it is formed of a solid piece rather than a channel construction, as in the case for most commercial combination tools. Channel constructions with fold-out implements are difficult to scale to small sizes, a primary objective of the present invention.

The first solid-body handle 54 is pivotably engaged by a first-handle axle pin 55 to the first lug 32. The first solid-body handle 54 may thereby pivot in the jaw mechanism plane between a first-handle closed position illustrated in FIGS. 1 and 2, where the first solid-body handle 54 lies immediately adjacent to the second jaw piece 26, and a first-handle open position illustrated in FIGS. 9 and 10, where the first solid-body handle 54 is extended away from the first jaw piece 24 and the second jaw piece 26. A first solid-body handle distal end 56 is formed as a first handle implement 58, in this case a Phillips-head screwdriver.

Figure 9:
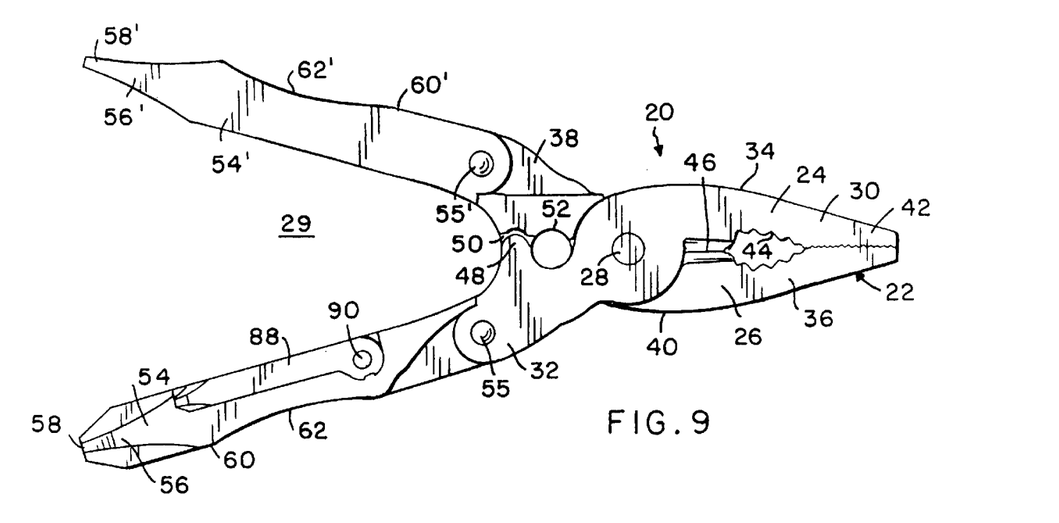
FIG. 9 is a top plan view of the hand tool illustrated in FIGS. 1–8, with the handles in the open position.
Figure 10:
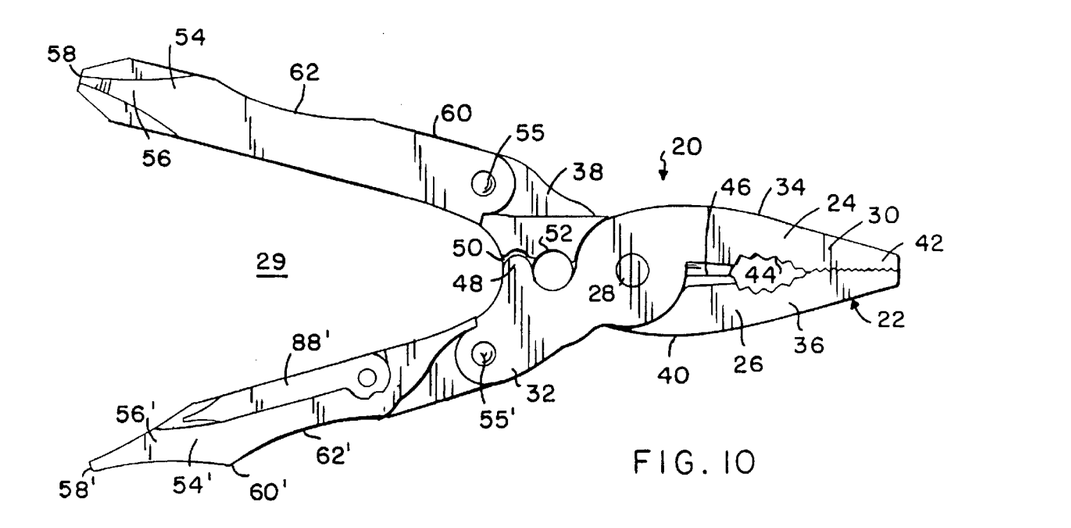
FIG. 10 is a bottom plan view of the hand tool illustrated in FIG. 9.

The first solid-body handle 54 has a first-handle external lateral surface 60 with a dished shape 62. The dished shape 62 serves two purposes. When the first solid-body handle 54 is pivoted to the closed position as illustrated in FIGS. 1 and 2, the dished shape 62 closely conforms to the second jaw piece external lateral surface 40, so that there is a close fit between the first solid-body handle 54 and the second jaw piece 24. This close fit permits the hand tool 20 to be compact in its closed state and also allows a design to be placed onto the broad face of the hand tool. When the first solid-body handle 54 is pivoted to the open position as illustrated in FIGS. 9 and 10, the dished shape 62 provides a sculpted grip for the jaw mechanism that is comfortable to hold and allows the user to apply a substantial force to the jaw mechanism.

A second solid-body handle 54' lies in the jaw mechanism plane 29. Like the handle 54, the handle 54' is termed a "solid-body" handle because it is formed of a solid piece rather than a channel construction, as is the case for most commercial combination tools.

The second solid-body handle 54' is pivotably engaged by a second-handle axle pin 55' to the second lug 38. The second solid-body handle 54' may thereby pivot in the jaw mechanism plane 29 between a second-handle closed position illustrated in FIGS. 1 and 2, where the second solid-body handle 54' lies immediately adjacent to the first jaw piece 24, and a second-handle open position illustrated in FIGS. 9 and 10, where the second solid-body handle 54' is extended away from the first jaw piece 24 and the second jaw piece 26. A second solid-body handle distal end 56' is formed as a second handle implement 58', in this case a slotted-head screwdriver.

The second solid-body handle 54' has a second-handle external lateral surface 60' with a dished shaped 62'. The dished shape 62' serves the same two purposes as the dished shape 62 of the first solid-body handle 54, discussed above.

A desirable feature of the hand tool 20 is the ability to controllably retain the handles 54 and 54' in the open position or the closed position with a mild retention force that initially resists movement away from the respective position but then is overcome with sufficient force so that the handle may be rotated. This mechanism is generally termed a "detent" mechanism. A detent mechanism is distinct from a positive lock which must be unlocked before the handle can be pivoted. The closing detent mechanism holds the handles in the closed position so that they do not unintentionally open in the pocket of the user and also so that the aperture 52 does not unintentionally open when it is retained to a key ring. The opening detent mechanism holds the handles in the open position so that the user of the tool may conveniently operate the jaw mechanism. Many detent mechanisms are known in the art, but some are relatively expensive and others are structured so that, if the hand tool were scaled to a small size, the detent mechanism would be too small and fragile to be practical.

Figure 11:
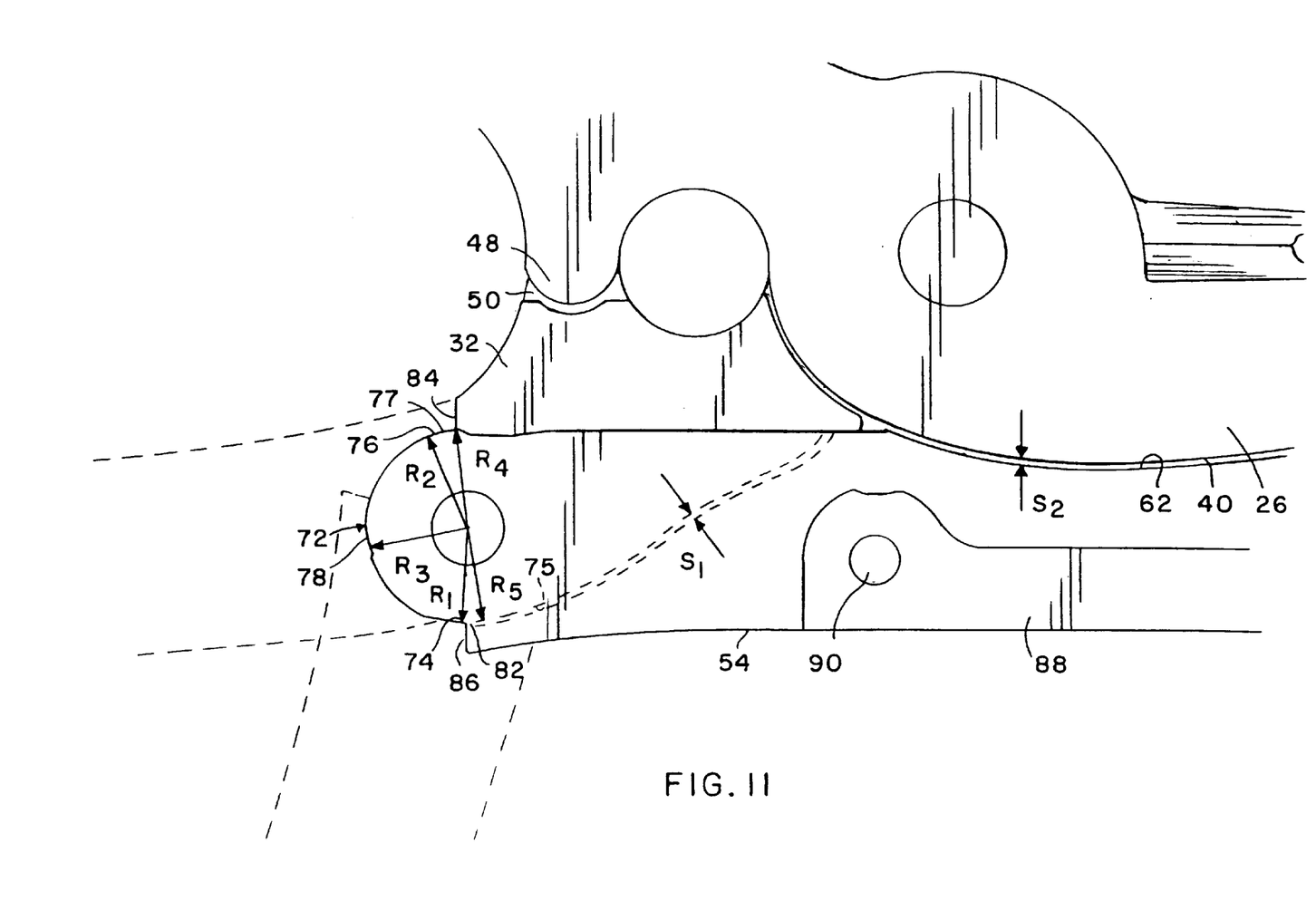
FIG. 11 is a detail of the area indicated by the number 11 in FIG. 1, illustrating the cam and detent structure.
Figure 12:
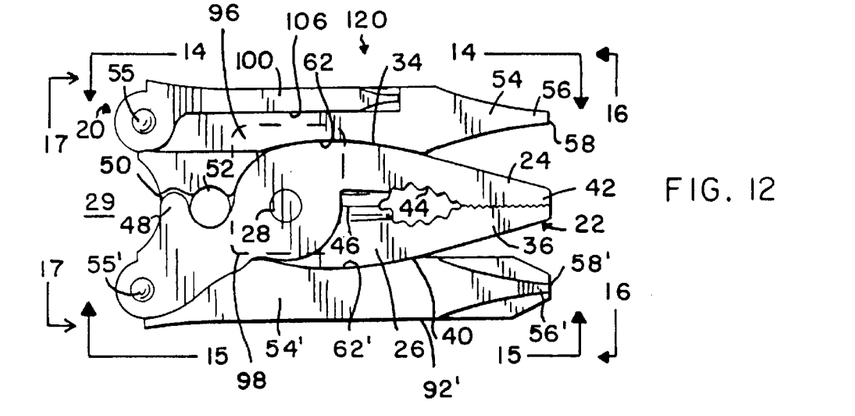
FIG. 12 is a top plan view of a second embodiment of the hand tool of the invention, with the handles in the closed position.
Figure 13:
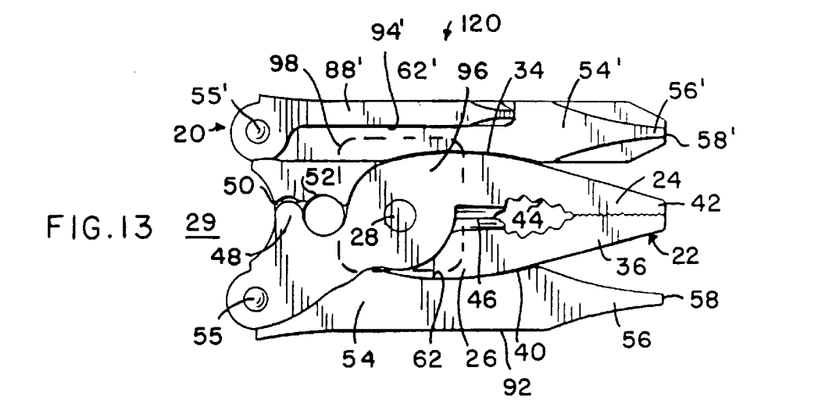
FIG. 13 is a bottom plan view of the hand tool of FIG. 12.
Figures 14, 15:
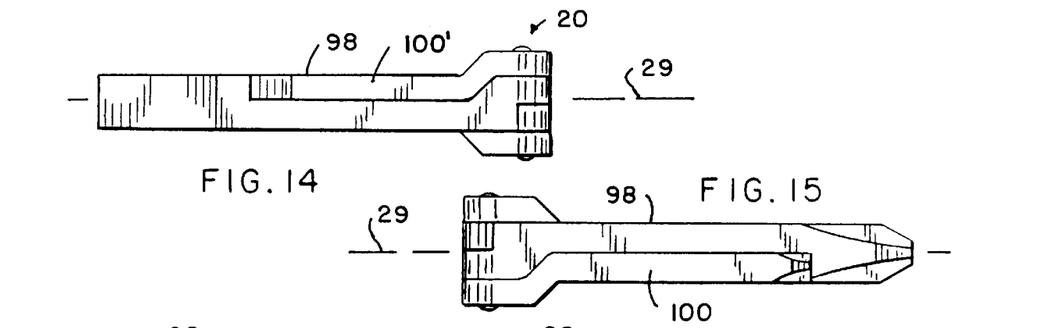
FIG. 14 is a side elevational view taken generally along the line 14—14 of FIG. 12.
FIG. 15 is a side elevational view taken generally along the line 15—15 of FIG. 12.
Figure 16:
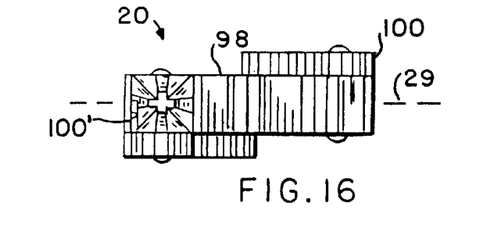
FIG. 16 is a front elevational view taken generally along the line 16—16 of FIG. 12.
Figure 17:
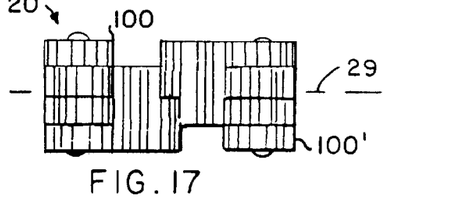
FIG. 17 is a rear elevational view taken generally along the line 17—17 of FIG. 12.

Both handles 54 and 54' are provided with a detent structure, and only one will be described in detail with the understanding that the other is identical. FIG. 11 illustrates the detent mechanism for the first solid-body handle 54. In FIG. 11, the axle pin 55 is removed to reveal a first pivot aperture 70 through the first handle 54 at a location remote from the first distal end 56.

The end of the first handle 54 adjacent to the first pivot aperture 70 is locally contoured to form a first-handle cam surface 72 which is disposed laterally adjacent to the first pivot aperture 70. The first-handle cam surface 72 has three separate but continuous regions. A closing first-handle cam surface 74 is positioned at a first distance $R_1$ from the first pivot aperture 70. An opening first-handle cam surface 76 is remote from the closing first-handle cam surface 74 and generally spaced about 165 degrees away from the closing first-handle cam surface 74. The opening first-handle cam surface 76 is positioned at a second distance $R_2$ from the first pivot aperture 70. The value of $R_2$ is about the same as the value of $R_1$ in the preferred embodiment. An intermediate first-handle cam surface 78 is disposed between the closing first-handle cam surface 74 and the opening first-handle cam surface 76. The intermediate first-handle cam surface 78 is positioned at a third distance $R_3$ from the first pivot aperture 70. The difference between the values of $R_3$ and $R_1$ determines the force required to move the first handle 54 from the intermediate position to the closed position, and the difference between the values of $R_3$ and $R_2$ determines the force required to move the first handle 54 from the intermediate position to the open position. The value of $R_3$ is less than the value of $R_1$ and $R_2$, by an amount of from about 0.002 inches to about 0.012 inches, and most preferably by an amount of about 0.008 inches. These relative values may be selected to produce the desired closing and opening force characteristics.

A "back" side 77 of the opening first-handle cam surface 76, remote from the intermediate first-handle cam surface 78, is positioned at a fourth distance $R_4$ from the aperture 70. A "back" side 75 of the closing first-handle cam surface 74, remote from the intermediate first-handle cam surface 78, is positioned at a fifth distance $R_5$ from the aperture 70. The value of $R_4$ is less than the value of $R_2$, and the value of $R_5$ is less than the value of $R_1$. The greater the difference between the value of $R_4$ and $R_2$, the greater the retention force holding the handle 54 in the open position. The greater the difference between the value of $R_1$ and $R_5$, the greater the retention force holding the handle 54 in the closed position. The differences are preferably from about 0.002 inches to about 0.012 inches, and most preferably about 0.004 inches.

The shapes of the cam surfaces 74, 75, 76, 77, and 78, and the transitions between the cam surfaces 74 and 78, and between the cam surfaces 76 and 78, may be relatively gradual or more steeply inclined, depending upon the exact nature of the detenting force that is desired. In the embodiment of FIG. 11, the side of the cam surface 74 remote from the cam surface 78 is relatively steeply inclined at an incline surface 80 having an angle of about 30 degrees to the local radius. The transition between the cam surfaces 76 and 78 is gradual, and no relatively narrow point of transition can be easily identified.

The first lug 32, which is pivotably joined to the first solid body handle 54 at the first pivot aperture 70 (by the first handle axle pin 55), has a first-lug cam rider surface 82 positioned in a facing relationship to the first-handle cam surface 72. The first-lug cam rider surface 82 rides along the first-handle cam surface 72 as the first solid-body handle is rotated between the first-handle closed position and the first-handle open position. When the first solid-body handle 54 is in or rotationally near its closed position as illustrated in FIGS. 1 and 2, the interfering cam relationship tends to urge the first solid-body handle 54 toward the closed position. When the first solid-body handle 54 is in or rotationally near its open position as illustrated in FIGS. 9 and 10, the interfering cam relationship tends to urge the first solid-body handle 54 toward the open position. In both cases, the urging force can be overcome by rotational force applied by the user. The previously discussed shape of the cam surface 72 is selected so that the required rotational force is sufficiently large so as to provide a sufficient retaining or detenting force, but not so large that the required force to overcome the detent is uncomfortable for the user. The differences between the values of $R_1$ and $R_2$, on the one hand, and value of $R_3$, on the other, determines the force required to move the handle 54 to the respective closed or open position. A difference value of about 0.008 inches has been found to provide the best compromise between these competing considerations. The shape of the intermediate first-handle cam surface 78 may be selected to give any desired "feel" to the opening and closing motion. Preferably, the intermediate first-handle cam surface 78 is of approximately constant distance from the aperture 70 from near the closing first-handle cam surface 74 and near the opening first-handle cam surface 76 so that the force required to rotate the handle 54 through this region is approximately constant to provide a smooth rotational feel for the user.

The closing camming action is provided by the contact between the first-lug cam rider surface 82 and the closing first-handle cam surface 74.

The relatively steep inclination angle, preferably about 30 degrees, of the first-lug cam rider surface 82 is selected to provide a positive retention detenting force in the closed position yet also produce a distinct and controlled spacing $S_1$ between the first handle 54 and the first lug 32, and a distinct and controlled spacing $S_2$ between the dished shape 62 of the first handle 54 and the second jaw piece external lateral surface 40, when the first handle 54 is in the closed position as shown in FIG. 11. In one preferred embodiment, $S_1$ is about 0.005 inches and $S_2$ is about 0.010 inches. This design approach produces a face of the combination tool with a close spacing between the handles and the jaw mechanism, so that the face is substantially continuous and coplanar. This structure is particularly advantageous when a logo or advertising is to be provided on the face, as will be discussed below. Secondly, when the combination tool is manufactured, there are inevitably small dimensional variations. During the service life of the tool, the mechanism may wear with repeated use. The described approach of the relation between the first-lug cam rider surface 82 and the closing first-handle cam surface 74 results in retention of a smooth camming action and a close fit, as exemplified by the values of $S_1$ and $S_2$, both initially and after extended service.

A first-handle stop shoulder 84 is preferably provided at the end of the opening first-handle cam surface 76 remote from the intermediate first-handle cam surface 78. A cooperating first-lug stop shoulder 86 is provided at the end of the first-handle 54. When the first handle 54 is pivoted to the open position, the stop shoulders 84 and 86 contact each other to limit the extent of rotation. When the first handle 54 and the second handle 54' are grasped to operate the jaw mechanism 22, the grasping force is reacted through the shoulders 84 and 86, providing a strong, secure grip.

Figure 7:
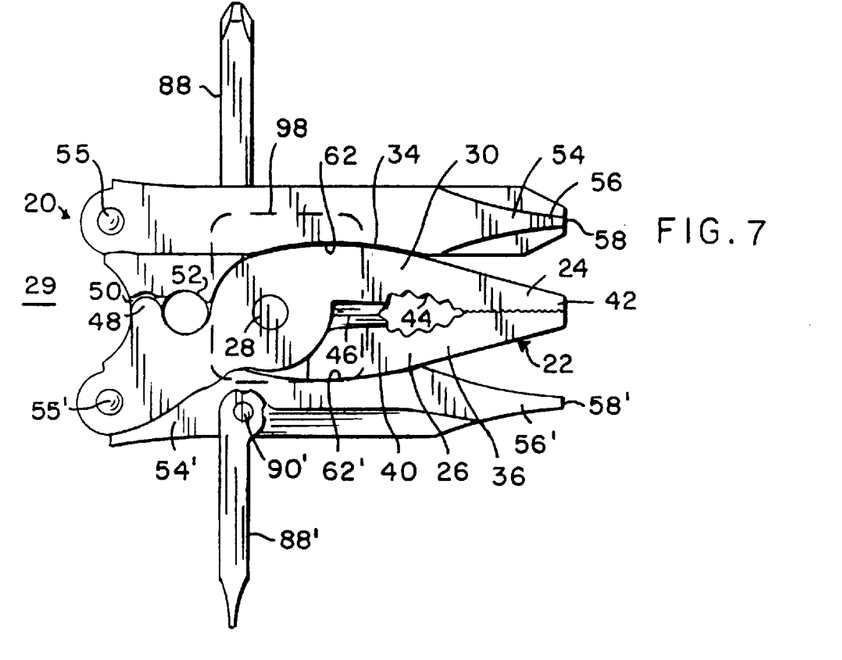
FIG. 7 is a plan view similar to that illustrated in FIG. 2, further illustrating secondary implements pivoted outwardly from the folded handles.
Figure 8:
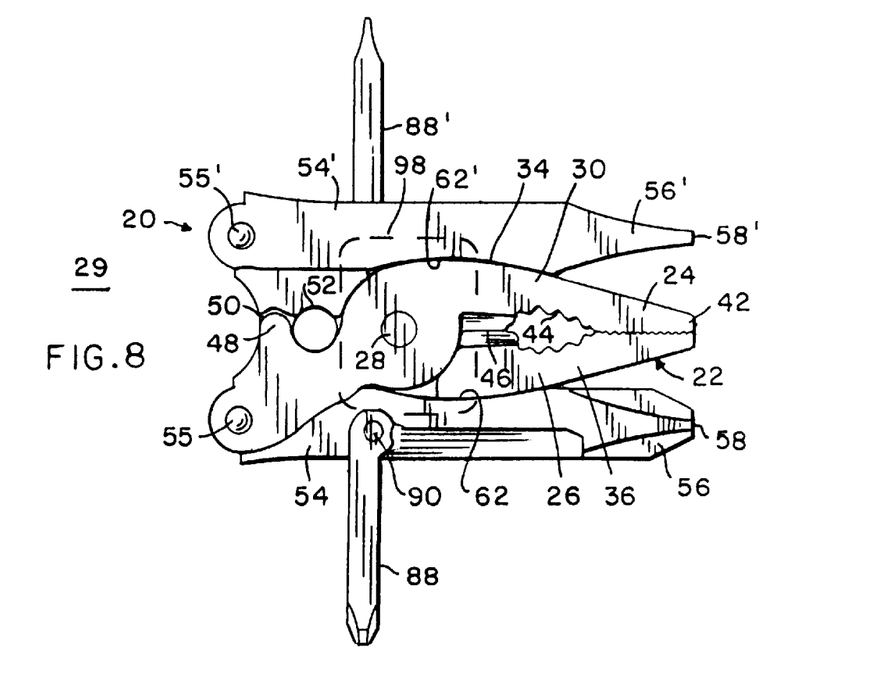
FIG. 8 a reversed plan view of the hand tool illustrated in FIG. 7.

Additionally, a first-handle secondary implement 88 is pivotably joined to the first solid body handle 54. The first-handle secondary implement 88 pivots about a first-handle secondary implement axle pin 90 which is spaced from the first axle pin 55. An adjacent side 92 of the first handle 54 is provided with a recess 94 into which the first-handle secondary implement 88 is received. The first-handle secondary implement 88 may be rotated to an open position when the first solid-body handle 54 is closed, as illustrated in FIGS. 7 and 8. The first-handle secondary implement 88 may be a smaller version of the first handle implement 58, as for example a smaller Phillips screw driver. The first-handle secondary implement 88 may also be a different implement. For example, the first-handle secondary implement 88 could be a small knife blade having the blade edge oriented so as to face the recess 94 when the first-handle secondary implement 88 is closed, so that the user is protected against injury by the knife edge. There may also be provided a similar secondary implement for the second handle 54', with generally the same structure as that just described.

As illustrated in FIGS. 1 and 2, one of the features of the present hand tool 20 is that a face 96 of the hand tool may be made broad and generally flat, without major gaps therein due to the close fit between the jaw piece external lateral surfaces (34 and 40) to the handle external lateral surfaces (60 and 60', respectively). This broad, flat surface allows a design 98 to be provided on the face of the hand tool, as illustrated in FIG. 7. The design may be provided in any operable manner, such as chemical etching, laser etching, painting, silk screening, pad printing, and the like. The size and shape of the design is preferably fitted to the available surface and shape of the face 96. The ability to place designs such as advertising materials or logos on the face of the useful hand tool is highly advantageous in a "premium" market segment.

The hand tool 20 may be made of magnetized material or it may have a magnet attached to one face thereof. Either approach allows the hand tool to be readily attached to a steel surface such as a refrigerator or stove, or a steel portion of an automobile. The use of a design 98 on one of the broad faces and a magnetized hand tool are desirably used in combination to produce a useful tool that bears an advertising or other logo and also may be attached and retained at a convenient location such as on the face of the refrigerator in a kitchen.

Figure 18:
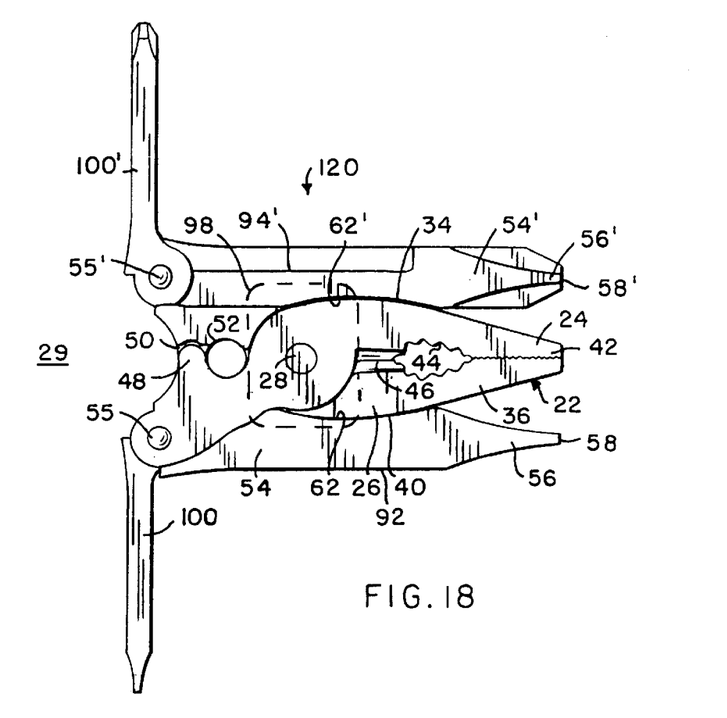
FIG. 18 is a bottom plan view of the second embodiment of the hand tool of the invention as illustrated in FIG. 13, illustrating secondary implements pivoted outwardly from the associated handles.
Figure 19:
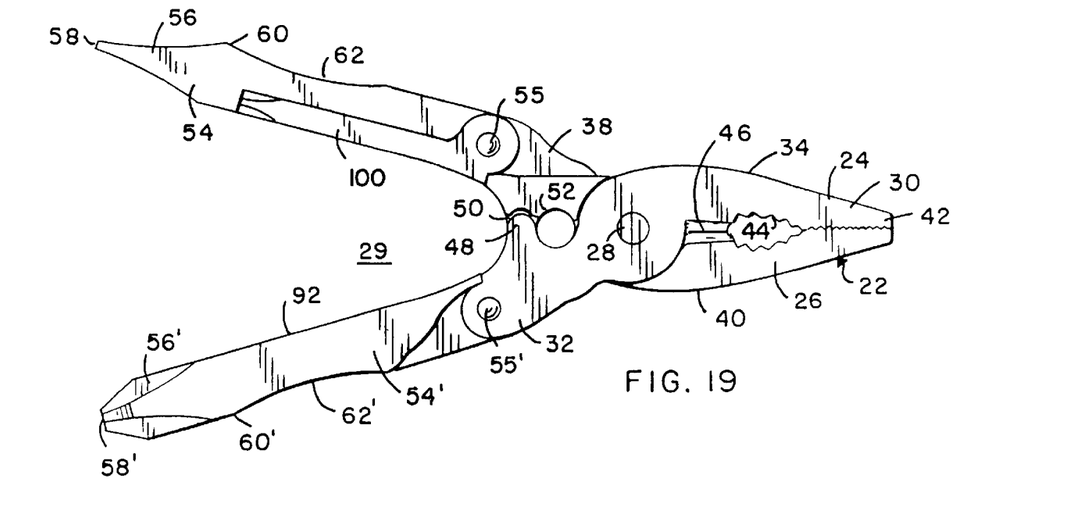
FIG. 19 is a top plan view of the second embodiment of the hand tool of the invention, with the handles in the open position.

FIGS. 12–19 illustrate a second embodiment of the invention. The hand tool 120 has the same features as the hand tool 20 described in relation to FIGS. 1–11, and that description is incorporated here. The primary difference between the two illustrated embodiments 20 and 120 lies in the secondary implements. In the hand tool 120 of FIGS. 12–19, the first-handle secondary implement 100 is pivotably joined to the first lug 32 and to the first solid-body handle 54 by the first handle axle pin 55. Like the secondary implement 88 of the first embodiment, an adjacent side 92 of the first handle 54 is provided with a recess 94 into which the first-handle secondary implement 100 is received. The first-handle secondary implement 100 may be rotated to an open position when the first solid-body handle 54 is closed, as illustrated in FIG. 18. Moreover, the first-handle secondary implement 100 may be a smaller version of the first handle implement 58, or it may be a different implement. There may also be provided a similar secondary implement for the second handle 54 and the second lug 38, with generally the same structure as that just described.

From the foregoing it will be appreciated that the present invention provides a smaller combination tool in relation to typical commercial combination tools, that provides a jaw mechanism as well as some of the implement features of the larger combination tools. The hand tools 20 and 120 described above may conveniently be clipped to an object such as a key ring, include sculpted handles which are convenient to grasp, and further provide detent features for the handles in the open and closed positions so that they are conveniently held in place during service.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A multi-purpose hand tool, comprising:
a pliers jaw mechanism lying in a jaw mechanism plane, the pliers jaw mechanism including a first jaw piece having a first jaw body, a first lug extending from the first jaw body and a first protrusion extending from the first lug, and a second jaw piece having a second jaw body, a second lug extending from the second jaw body and a second protrusion extending from the second lug, the first jaw piece and the second jaw piece being pivotably joined together to pivot about a jaw axis between a first jaw position wherein the jaw pieces are closed together and a second jaw position wherein the jaw pieces are not closed together, and the first protrusion and the second protrusion together defining an aperture when the jaw pieces are closed together so that the first jaw body contacts the second jaw body;
a first handle lying in the jaw mechanism plane and connected to the first lug by a first handle axle pin to pivot between a first handle closed position wherein the first handle is adjacent to the second jaw piece and a first handle open position wherein the first handle is extended away from the first jaw piece; and
a second handle lying in the jaw mechanism plane and connected to the second lug by a second handle axle pin to pivot between a second handle closed position wherein the second handle is adjacent to the first jaw piece and a second handle open position wherein the second handle is extended away from the second jaw piece.

2. The hand tool of claim 1, wherein at least a portion of the hand tool is made of a magnetic material.

3. The hand tool of claim 1, wherein the first handle includes a first handle distal end formed as a first handle implement.

4. The hand tool of claim 3, further including a first-handle secondary implement pivotably joined to the first handle.

5. The hand tool of claim 4, wherein the first-handle secondary implement pivots about a first-handle secondary implement axle pin spaced from the first handle axle pin.

6. The hand tool of claim 3, wherein the second handle includes a second handle distal end formed as a second handle implement.

7. The hand tool of claim 6, further including a second-handle secondary implement pivotably joined to the second handle.

8. The hand tool of claim 7, wherein the second-handle secondary implement pivots about a second-handle secondary implement axle pin spaced from the second handle axle pin.

9. The hand tool of claim 1, wherein the first handle includes a first pivot aperture therethrough and a first handle cam surface locally defining the surface of the first handle and disposed laterally adjacent to the first pivot aperture, the first handle cam surface comprising a closing first-handle cam surface at a first-handle cam surface first distance from the first pivot aperture, an opening first-handle cam surface remote from the closing first-handle cam surface and at about the first-handle cam surface first distance from the first pivot aperture, and an intermediate first-handle cam surface disposed between the closing first-handle cam surface and the opening first-handle surface and at a first-handle cam surface second distance from the first pivot aperture, wherein the first-handle cam surface second distance is less than the first-handle cam surface first distance.

10. The hand tool of claim 9, wherein the first-handle cam surface second distance is from about 0.002 inches to about 0.012 inches less than the first-handle cam surface first distance.

11. The hand tool of claim 9, wherein the first lug comprises a first-lug cam rider surface positioned in a facing relationship to the first-handle cam surface and disposed to ride thereon as the first handle is moved between the first-handle closed position and the first-handle open position.

12. The hand tool of claim 11, wherein the opening first-handle cam surface terminates in a first-handle shoulder remote from the intermediate first-handle cam surface, and wherein the first-lug cam rider surface includes a first-lug shoulder disposed to engage the first-handle shoulder when the first handle is in the first-handle open position.

13. The hand tool of claim 9, wherein the second handle includes a second pivot aperture therethrough and a second handle cam surface locally defining the surface of the second handle and disposed laterally adjacent to the second pivot aperture, the second handle cam surface comprising a closing second-handle cam surface at a second-handle cam surface first distance from the second pivot aperture, an opening second-handle cam surface remote from the closing second-handle cam surface and at about the second-handle cam surface first distance from the second pivot aperture, and an intermediate second-handle cam surface disposed between the closing second-handle cam surface and the opening second-handle cam surface and at a second-handle cam surface second distance from the second pivot aperture, wherein the second-handle cam surface second distance is less than the second-handle cam surface first distance.

14. The hand tool of claim 13, wherein the second-handle cam surface second distance is from about 0.002 inches to about 0.012 inches less than the second-handle cam surface first distance.

15. The hand tool of claim 13, wherein the second lug comprises a second-lug cam rider surface positioned in a facing relationship to the second handle cam surface and disposed to ride thereon as the second handle is moved between the second handle closed position and the second handle open position.

16. The hand tool of claim 15, wherein the opening second-handle cam surface terminates in a second-handle shoulder remote from the intermediate second-handle cam surface, and wherein the second-lug cam rider surface includes a second-lug shoulder disposed to engage the second-handle shoulder when the second handle is in the second-handle open position.

17. The hand tool of claim 1, wherein the first jaw piece includes a first jaw piece external lateral surface, the second jaw piece includes a second jaw piece external lateral surface, the first handle has a first handle external lateral surface having a dished shape to conform to at least a portion of the second jaw piece external lateral surface, and wherein the second handle has a second handle external lateral surface having a dished shape to conform to at least a portion of the first jaw piece external lateral surface.

18. A multi-purpose hand tool, comprising:
a pliers jaw mechanism lying in a jaw mechanism plane, the pliers jaw mechanism including a first jaw piece having a first jaw body and a first lug extending from the first jaw body, and a second jaw piece having a second jaw body and a second lug extending from the second jaw body, the first jaw piece and the second jaw piece being pivotably joined together to pivot about a jaw axis between a first jaw position wherein the jaw pieces are closed together and a second jaw position wherein the jaw pieces are not closed together;
a first handle lying in the jaw mechanism plane and connected to the first lug by a first handle axle pin to pivot between a first handle closed position wherein the first handle is adjacent to the second jaw piece and a first handle open position wherein the first handle is extended away from the first jaw piece, the first handle including a first handle distal end formed as a first handle implement;
a second handle lying in the jaw mechanism plane and connected to the second lug by a second handle axle pin to pivot between a second handle closed position wherein the second handle is adjacent to the first jaw piece and a second handle open position wherein the second handle is extended away from the second jaw piece, the second handle including a second handle distal end formed as a second handle implement;
a first-handle secondary implement pivotably joined to the first handle; and
a second-handle secondary implement pivotably joined to the second handle;
wherein the first handle includes a first pivot aperture therethrough and a first handle cam surface locally defining the surface of the first handle and disposed laterally adjacent to the first pivot aperture, the first handle cam surface comprising a closing first-handle cam surface at a first-handle cam surface first distance from the first pivot aperture, an opening first-handle cam surface remote from the closing first-handle cam surface and at about the first-handle cam surface first distance from the first pivot aperture, and an intermediate first-handle cam surface disposed between the closing first-handle cam surface and the opening first-handle surface and at a first-handle cam surface second distance from the first pivot aperture, wherein the first-handle cam surface second distance is less than the first-handle cam surface first distance.

19. The hand tool of claim 18, wherein the first-handle secondary implement pivots about a first-handle secondary implement axle pin spaced from the first handle axle pin, and wherein the second-handle secondary implement pivots about a second-handle secondary implement axle pin spaced from the second handle axle pin.

20. The hand tool of claim 18, wherein the first lug comprises a first-lug cam rider surface positioned in a facing relationship to the first-handle cam surface and disposed to ride thereon as the first handle is moved between the first-handle closed position and the first-handle open position, and wherein the opening first-handle cam surface terminates in a first-handle shoulder remote from the intermediate first-handle cam surface, and wherein the first-lug cam rider surface includes a first-lug shoulder disposed to engage the first-handle shoulder when the first handle is in the first-handle open position.

21. The hand tool of claim 18, wherein the second handle includes a second pivot aperture therethrough and a second handle cam surface locally defining the surface of the second handle and disposed laterally adjacent to the second pivot aperture, the second handle cam surface comprising a closing second-handle cam surface at a second-handle cam surface first distance from the second pivot aperture, an opening second-handle cam surface remote from the closing second-handle cam surface and at about the second-handle cam surface first distance from the second pivot aperture, and an intermediate second-handle cam surface disposed between the closing second-handle cam surface and the opening second-handle cam surface and at a second-handle cam surface second distance from the second pivot aperture, wherein the second-handle cam surface second distance is less than the second-handle cam surface first distance.

22. The hand tool of claim 21, wherein the second lug comprises a second-lug cam rider surface positioned in a facing relationship to the second handle cam surface and disposed to ride thereon as the second handle is moved between the second handle closed position and the second handle open position, and wherein the opening second-handle cam surface terminates in a second-handle shoulder remote from the intermediate second-handle cam surface, and wherein the second-lug cam rider surface includes a second-lug shoulder disposed to engage the second-handle shoulder when the second handle is in the second-handle open position.

23. A multi-purpose hand tool, comprising:
a pliers jaw mechanism lying in a jaw mechanism plane, the pliers jaw mechanism including a first jaw piece having a first jaw body and a first lug extending from the first jaw body, and a second jaw piece having a second jaw body and a second lug extending from the second jaw body, the first jaw piece and the second jaw piece being pivotably joined together to pivot about a jaw axis between a first jaw position wherein the jaw pieces are closed together and a second jaw position wherein the jaw pieces are not closed together;

a first handle lying in the jaw mechanism plane and connected to the first lug by a first handle axle pin to pivot between a first handle closed position wherein the first handle is adjacent to the second jaw piece and a first handle open position wherein the first handle is extended away from the first jaw piece, the first handle including a first handle distal end formed as a first handle implement;

a second handle lying in the jaw mechanism plane and connected to the second lug by a second handle axle pin to pivot between a second handle closed position wherein the second handle is adjacent to the first jaw piece and a second handle open position wherein the second handle is extended away from the second jaw piece, the second handle including a second handle distal end formed as a second handle implement;

a first-handle secondary implement pivotably joined to the first handle; and a second-handle secondary implement pivotably joined to the second handle;

wherein the first jaw piece includes a first jaw piece external lateral surface, the second jaw piece includes a second jaw piece external lateral surface, the first handle has a first handle external lateral surface having a dished shape to conform to at least a portion of the second jaw piece external lateral surface, and wherein the second handle has a second handle external lateral surface having a dished shape to conform to at least a portion of the first jaw piece external lateral surface; and wherein the first lug includes a first protrusion extending toward the second lug at a location remote from the first jaw body, and wherein the second lug includes a second protrusion extending toward the first lug at a location remote from the second jaw body, the first protrusion and the second protrusion together defining an aperture when the jaw pieces are closed together so that the first jaw body contacts the second jaw body.

\* \* \* \* \*